United States Patent
Huang et al.

(10) Patent No.: US 10,100,231 B2
(45) Date of Patent: Oct. 16, 2018

(54) ADHESIVE HAVING STRUCTURAL INTEGRITY AND INSULATIVE PROPERTIES

(71) Applicant: HENKEL IP & HOLDING GMBH, Duesseldorf (DE)

(72) Inventors: Tianjian Huang, Hillsborough, NJ (US); Robert Sandilla, Wexford, PA (US); Daniel Waski, Elmhurst, IL (US); Kristina Thompson, Clinton, NJ (US); John Meccia, Ringoes, NJ (US)

(73) Assignee: HENKEL IP & HOLDING GMBH, Duesseldorf (DE)

( * ) Notice: Subject to any disclaimer, the term of this patent is extended or adjusted under 35 U.S.C. 154(b) by 0 days.

(21) Appl. No.: 15/475,685

(22) Filed: Mar. 31, 2017

(65) Prior Publication Data

US 2017/0204303 A1 Jul. 20, 2017

Related U.S. Application Data

(60) Division of application No. 14/092,110, filed on Nov. 27, 2013, now Pat. No. 9,771,499, which is a continuation-in-part of application No. 13/775,348, filed on Feb. 25, 2013, now Pat. No. 8,747,603, which is a continuation of application No. PCT/US2011/050965, filed on Sep. 9, 2011, application No. 15/475,685, filed on Mar. 31, 2017, which is a division of application No. 14/092,110, filed on Nov. 27, 2013, now Pat. No. 9,771,499, which is a continuation of application No. 13/826,451, filed on Mar. 14, 2013, now Pat. No. 9,657,200.

(60) Provisional application No. 61/381,642, filed on Sep. 10, 2010, provisional application No. 61/706,447, filed on Sep. 27, 2012.

(51) Int. Cl.

| | |
|---|---|
| C09J 11/08 | (2006.01) |
| C09J 131/04 | (2006.01) |
| D21H 19/10 | (2006.01) |
| D21H 27/36 | (2006.01) |
| D21H 11/14 | (2006.01) |
| D21H 21/52 | (2006.01) |
| B32B 7/12 | (2006.01) |
| B32B 3/28 | (2006.01) |
| B32B 1/02 | (2006.01) |
| D21H 19/54 | (2006.01) |
| D21H 21/54 | (2006.01) |
| D21H 27/10 | (2006.01) |
| D21H 19/24 | (2006.01) |
| B65D 81/38 | (2006.01) |
| C08K 9/10 | (2006.01) |
| C08L 3/02 | (2006.01) |

(52) U.S. Cl.
CPC ............. *C09J 11/08* (2013.01); *B32B 1/02* (2013.01); *B32B 3/28* (2013.01); *B32B 7/12* (2013.01); *B65D 81/3858* (2013.01); *B65D 81/3874* (2013.01); *C09J 131/04* (2013.01); *D21H 11/14* (2013.01); *D21H 19/10* (2013.01); *D21H 19/24* (2013.01); *D21H 19/54* (2013.01); *D21H 21/52* (2013.01); *D21H 21/54* (2013.01); *D21H 27/10* (2013.01); *D21H 27/36* (2013.01); *C08K 9/10* (2013.01); *C08L 3/02* (2013.01); *C08L 2205/025* (2013.01); *C09J 2205/11* (2013.01); *C09J 2403/00* (2013.01); *C09J 2429/00* (2013.01); *C09J 2431/00* (2013.01); *Y10T 428/1376* (2015.01); *Y10T 428/24711* (2015.01); *Y10T 428/249972* (2015.04)

(58) Field of Classification Search
CPC ......... C09J 11/08; C09J 131/04; D21H 19/10; D21H 27/36; D21H 11/14; D21H 21/52; D21H 21/54; B32B 1/02; B32B 7/12; B65D 81/3874; B65D 81/3858
USPC ........................................................ 524/557
See application file for complete search history.

(56) References Cited

U.S. PATENT DOCUMENTS

| | | | |
|---|---|---|---|
| 2,998,501 A | 8/1961 | Edberg et al. | |
| 3,253,064 A | 5/1966 | Buonaiuto | |
| 3,401,475 A | 9/1968 | Morehouse et al. | |
| 3,563,851 A | 2/1971 | Armour et al. | |
| 3,615,972 A | 10/1971 | Morehouse, Jr. et al. | |
| 4,005,033 A * | 1/1977 | Georgeau | C09D 5/34 521/59 |
| 4,006,273 A | 2/1977 | Wolinski et al. | |
| 4,094,685 A * | 6/1978 | Lester | C09D 5/06 521/76 |

(Continued)

FOREIGN PATENT DOCUMENTS

| | | |
|---|---|---|
| CA | 2078476 A1 | 3/1993 |
| CA | 2145938 A1 | 10/1995 |

(Continued)

OTHER PUBLICATIONS

Popil, Roman E. et al. "Adhesive level effect on corrugated board strength—experiment and FE modeling." In: International progress in paper physics seminar. Oxford, Ohio: Miami University, 2006.

(Continued)

*Primary Examiner* — Michael Bernshteyn
(74) *Attorney, Agent, or Firm* — Sun Hee Lehmann

(57) ABSTRACT

An adhesive composition that provides improved structural integrity and insulative properties when applied to a substrate is provided. The adhesive composition includes an emulsion-based polymer, a plurality of microspheres; and optionally, water and plasticizer.

11 Claims, 1 Drawing Sheet

(56) References Cited

U.S. PATENT DOCUMENTS

| | | |
|---|---|---|
| 4,350,788 A | 9/1982 | Shimokawa et al. |
| 4,483,889 A | 11/1984 | Andersson |
| 5,114,509 A | 5/1992 | Johnston et al. |
| 5,264,467 A | 11/1993 | DiStefano |
| 5,356,683 A | 10/1994 | Egolf et al. |
| 5,387,626 A * | 2/1995 | Bohme-Kovac ...... C04B 24/383 524/35 |
| 5,393,336 A | 2/1995 | Foran et al. |
| 5,542,599 A | 8/1996 | Sobol |
| 5,685,480 A | 11/1997 | Choi |
| 5,928,741 A * | 7/1999 | Andersen ............ B29C 51/10 206/524.3 |
| 6,139,961 A | 10/2000 | Blankenship et al. |
| 6,231,970 B1 | 5/2001 | Andersen et al. |
| 6,255,369 B1 | 7/2001 | Philbin et al. |
| 6,379,497 B1 | 4/2002 | Sandstrom et al. |
| 6,648,955 B1 | 11/2003 | Swiezkowski et al. |
| 6,740,373 B1 | 5/2004 | Swoboda et al. |
| 6,749,705 B2 | 6/2004 | Skryniarz et al. |
| 6,838,187 B2 | 1/2005 | Figiel et al. |
| 7,335,279 B2 * | 2/2008 | Mohan .................. D21H 21/54 162/134 |
| 2002/0068139 A1 | 6/2002 | Polak et al. |
| 2002/0071947 A1 | 6/2002 | Soane et al. |
| 2002/0094403 A1 | 7/2002 | Lshikawa et al. |
| 2004/0033343 A1 | 2/2004 | Comeau et al. |
| 2007/0009723 A1 | 1/2007 | Ogawa et al. |
| 2007/0155859 A1 | 7/2007 | Song et al. |
| 2007/0224395 A1 | 9/2007 | Rowitsch et al. |
| 2007/0228134 A1 | 10/2007 | Cook et al. |
| 2007/0287776 A1 | 12/2007 | Nordin et al. |
| 2008/0118693 A1 | 5/2008 | Bilski et al. |
| 2009/0280322 A1 | 11/2009 | Daniels et al. |
| 2009/0321508 A1 | 12/2009 | Fu et al. |
| 2010/0012712 A1 | 1/2010 | Swoboda et al. |
| 2010/0136269 A1 | 6/2010 | Andersen et al. |
| 2010/0139878 A1 | 6/2010 | Nicolucci |
| 2010/0181015 A1 | 7/2010 | Kohler |
| 2011/0019121 A1 | 1/2011 | Mo et al. |
| 2011/0033398 A1 | 2/2011 | Cauvin et al. |
| 2012/0015162 A1 | 1/2012 | Lion et al. |
| 2012/0048450 A1 | 3/2012 | Fu et al. |
| 2012/0100289 A1 | 4/2012 | Egan et al. |
| 2013/0160945 A1 | 6/2013 | Huang et al. |
| 2013/0303351 A1 | 11/2013 | Fu et al. |
| 2014/0131367 A1 | 5/2014 | Bordary et al. |

FOREIGN PATENT DOCUMENTS

| | | |
|---|---|---|
| CN | 1643100 A | 7/2005 |
| CN | 101263184 A | 9/2008 |
| CN | 101476265 A | 7/2009 |
| EP | 1216146 B1 | 10/2005 |
| EP | 1634897 A2 | 3/2006 |
| EP | 1674543 A1 | 6/2006 |
| EP | 1780250 A1 | 5/2007 |
| JP | S6144965 A | 3/1986 |
| JP | H05239423 A | 9/1993 |
| JP | 6313163 A | 11/1994 |
| JP | H08175576 A | 7/1996 |
| JP | 9-164621 A | 6/1997 |
| JP | 09217050 A | 8/1997 |
| JP | 2001207146 A | 7/2001 |
| JP | 2003-154589 A | 5/2003 |
| JP | 2005097816 A | 4/2005 |
| JP | 2010202996 A | 9/2010 |
| WO | 9014223 A1 | 11/1990 |
| WO | 0162986 A1 | 8/2001 |
| WO | 0200800 A2 | 1/2002 |
| WO | 0231077 A2 | 4/2002 |
| WO | 2005110737 A1 | 11/2005 |
| WO | 2007091961 A1 | 8/2007 |
| WO | 2007135451 A1 | 11/2007 |
| WO | 2007142593 A1 | 12/2007 |
| WO | 2008084372 A1 | 7/2008 |

OTHER PUBLICATIONS

Bermesheva, E.V. "Zavisimost mezhdu vyazkouprugimi I adgezivnymi svoistvami polimernykh adgezivov. Dopolneni kriteriya liplosti Dalkkuista", 25 Sipozium Po Reologii, G.Ostashkov, Sep. 5-10, 2010, pp. 61, 62.

* cited by examiner

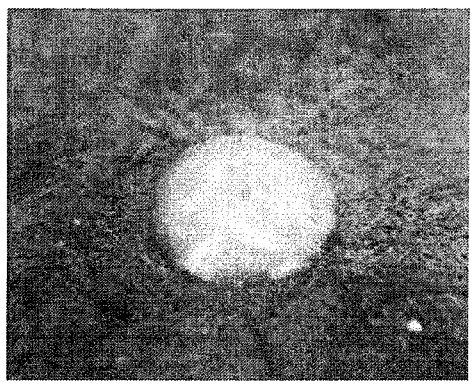
(a)
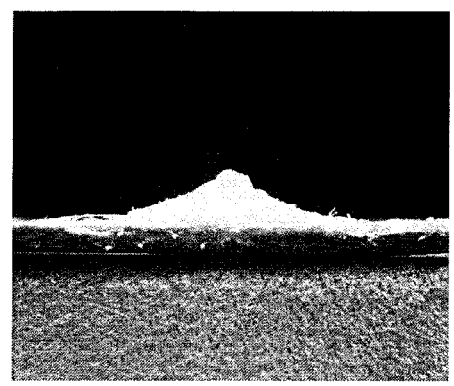
(b)
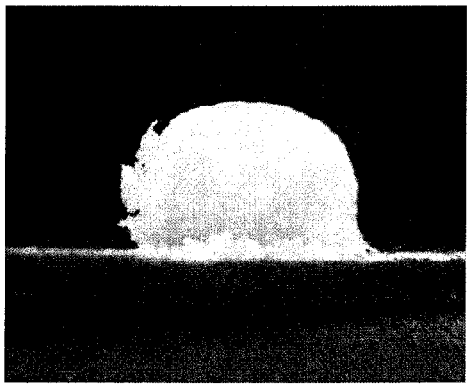
(c)
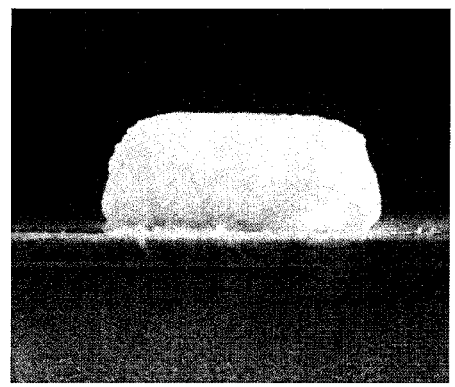
(d)

ADHESIVE HAVING STRUCTURAL INTEGRITY AND INSULATIVE PROPERTIES

CROSS-REFERENCE TO RELATED APPLICATIONS

The application is a divisional of U.S. Non-Provisional patent application Ser. No. 14/092,110 filed Nov. 27, 2013, which is a continuation-in-part of U.S. Non-Provisional patent application Ser. No. 13/775,348 filed Feb. 25, 2013, which is a continuation of International Patent Application No. PCT/US2011/050965 filed Sep. 9, 2011, which claims the benefit of U.S. Provisional Patent Application No. 61/381,642 filed Sep. 10, 2010, the contents of all of which are incorporated herein by reference. The application is also a divisional of U.S. Non-Provisional patent application Ser. No. 14/092,110 filed Nov. 27, 2013, which is a continuation-in-part of U.S. Non-Provisional patent application Ser. No. 13/826,451 filed Mar. 14, 2013, which claims the benefit of U.S. Provisional Patent Application No. 61/706,447 filed Sep. 27, 2012, the contents of both of which are incorporated herein by reference.

FIELD OF THE INVENTION

The present invention relates to an adhesive composition having improved insulative properties while maintaining structural integrity when applied onto a package. In particular, the invention includes an adhesive composition and method of making an adhesive composition in providing insulation to multilayer substrates.

BACKGROUND OF THE INVENTION

Multilayer substrate articles comprise individual substrates bonded together with adhesives. Typically, cellulosic sheet, e.g., paperboard, cardboard, paper, coated paper, films, are bonded together with waterborne adhesives to form containers for consumer products such as cups, food containers, cases, cartons, bags, boxes, envelopes, wraps, lids, clamshells, and the like. Other non-multilayer substrate articles provide sufficient insulation but they are plastic based, e.g., polyurethanes, polystyrenes, and are considered as environmentally unsound.

While typical adhesives, such as hot melt adhesives, are sufficient to adhere the various layers of the insulating paper together, these adhesives do not act as insulation themselves. Also, in order to improve the strength of low basis weight substrates, *Adhesive Level Effect on Corrugated Board Strength-Experiment and FE Modeling* teaches to increase the amount of adhesives interposed between the substrates. However, increasing the amount of the adhesive in the article lengthens the drying time and thereby decreases manufacturing speed. Long drying time or heaters must be used to drive the water out of the substrates, which increases energy consumption.

The present invention seeks to improve insulating substrates, through the use of an adhesive composition that adds insulative properties to the product. The present invention provides an environmentally sound package that provides sufficient structural integrity and thermal insulation while reducing the overall quantity of adhesives to the substrates upon which it is being applied.

The present invention relates to a water-based resin emulsion composition and method of using the water-based resin emulsion composition, which provides a greater insulation while providing structural integrity.

SUMMARY OF THE INVENTION

The present invention relates to an adhesive composition and method of using a water-based resin emulsion composition, which provides a greater insulation while providing structural integrity. The present invention further provides a multilayer-substrate article that comprises the water-based resin emulsion adhesive interposed between the two substrates.

In a first embodiment, there is provided an adhesive composition comprising (a) an emulsion-based polymer selected from the group consisting of vinyl acetate ethylene dispersion, polyvinyl acetate, polyvinyl acetate polyvinyl alcohol, dextrin stabilized polyvinyl acetate, polyvinyl acetate copolymers, vinyl acetate-ethylene copolymers, vinylacrylic, styrene acrylic, acrylic, styrene butyl rubber, polyurethane and mixtures thereof; (b) a plurality of microspheres; and optionally (c) water and (d) plasticizer. The volume of the expanded adhesive is at least 200% greater than the dry volume of the unexpanded adhesive.

In another embodiment, there is provided an adhesive composition comprising (a) an emulsion-based polymer selected from the group consisting of vinyl acetate ethylene dispersion, polyvinyl acetate, polyvinyl acetate polyvinyl alcohol, dextrin stabilized polyvinyl acetate, polyvinyl acetate copolymers, vinyl acetate-ethylene copolymers, vinylacrylic, styrene acrylic, acrylic, styrene butyl rubber, polyurethane and mixtures thereof; (b) a plurality of microspheres; and optionally (c) water and (d) plasticizer. The volume of the expanded adhesive is at least 200% greater than the wet volume of the unexpanded adhesive.

Still another embodiment provides an article of manufacture, which is a multilayer substrate container that comprises a substrate and an adhesive composition interposed between the substrates. The adhesive composition comprises (a) an emulsion-based polymer; (b) a plurality of microspheres; and optionally (c) water and (d) plasticizer. The volume of the expanded adhesive of the article is at least 200% greater than the dry volume of the unexpanded adhesive.

BRIEF DESCRIPTION OF THE FIGURE

FIG. 1 is a photograph of the adhesive in various states on a substrate: (a) wet adhesive on a paper substrate; (b) dried adhesive on the substrate; (c) expanded adhesive on the substrate; and (d) compressed adhesive on a substrate.

DETAILED DESCRIPTION OF THE INVENTION

The present invention provides an adhesive composition and an article of manufacture comprising the adhesive composition, which provides a greater insulation while providing structural integrity to the article. The adhesive and the article require less carbon footprint, e.g., heat and trees, than conventional hot melt adhesives and multilayer substrates with heavier basis weight substrates.

The present invention is based on the discovery that an adhesive composition with a plurality of expandable microspheres provides improved structural integrity and thermal insulation. The adhesive compositions described herein may be useful in an article comprising multilayer substrates. Through the use of the inventive adhesive composition, a greater insulation space may be provided between the two substrates which it is attached at the point of adhesion. Such article containing the multilayer substrates avoids the need for a medium, and thus, is a more environmentally conscious product. The insulating products useful herein include paper products for consumer use, such as for hot drinking cups and lids, cold drinking cups and lids, hot food containers and lids, cold food containers and lids, freezer cartons and cases, and the like.

The adhesive composition may be made from any number of materials. Desirably, the adhesive composition includes an emulsion polymer component, a plurality of microspheres, and optionally, plasticizer and water. The adhesive composition may further include one or more preservatives, tackifiers or fillers. Other materials that do not adversely affect the adhesive and insulating properties of the adhesive composition may be used as desired.

The adhesive composition includes an emulsion polymer component. The emulsion polymer may be present in the adhesive composition in any amount, and desirably is present in an amount of from about 50% to about 99.5 wt %, preferably from about 50% to about 70 wt %, by weight of the adhesive composition prior to setting of the composition. Depending on the emulsion polymer, the solid levels vary from about 40 wt % to about 60 wt %, based on the emulsion polymer. The emulsion polymer component may include any desired polymer components, including vinyl acetate ethylene dispersion, polyvinyl acetate, polyvinyl acetate polyvinyl alcohol, dextrin stabilized polyvinyl acetate, polyvinyl acetate copolymers, vinyl acetate ethylene copolymers, vinylacrylic, styrene acrylic, acrylic, styrene butyl rubber, polyurethane and mixtures thereof. Particularly preferred emulsion polymer components are vinyl acetate ethylene dispersion and polyvinyl acetate.

The adhesive composition includes a plurality of preexpanded or expandable microspheres. The pre-expanded microspheres are fully expanded and do not need to undergo further expansion. The expandable microspheres useful in the present invention should be capable of expanding in size in the presence of heat and/or radiation energy (including, for example, microwave, infrared, radiofrequency, and/or ultrasonic energy). The microspheres useful in the present invention include, for example, heat expandable polymeric microspheres, including those having a hydrocarbon core and a polyacrylonitrile shell (such as those sold under the trade name DUALITE®) and other similar microspheres (such as those sold under the trade name EXPANCEL®). The expandable microspheres may have any unexpanded size, including from about 12 microns to about 30 microns in diameter. In the presence of heat, the expandable microspheres of the present invention may be capable of increasing in diameter by about 3 times to about 10 times. Upon expansion of the microspheres in the adhesive composition, the adhesive composition becomes a foam-like material, which has improved insulation properties. It may be desired, the expansion of the microspheres takes place in a partially set adhesive composition.

The expandable microspheres have a particular temperature at which they begin to expand and a second temperature at which they have reached maximum expansion. Different grades of microspheres have different expansion temperature (Texp) and maximum expansion temperature (Tmax). For example, one particularly useful microsphere has a Texp of about 80° C. and a Tmax of about 90° C. While any particular grade of microspheres may be used in the present invention, the Texp and Tmax of the microspheres should be taken into account when formulating and processing. The temperature at which the microspheres have reached maximum expansion (Tmax) is desirably from about 120° C. to about 140° C.

Although the choice of the particular microspheres and their respective Texp and Tmax is not critical to the invention, the processing temperatures may be modified depending upon these temperatures. Before the adhesive composition is fully dried, these microspheres are able to move within the composition and are able to expand. Once the adhesive composition is fully dry, however, the microspheres are substantially locked in place, making expansion thereof difficult, if not impossible.

In preferred embodiments, it is desirable that the expandable microspheres be present in the adhesive composition in an amount of from about 0.1% to about 10% by weight of the adhesive composition prior to setting of the composition, and more desirably from about 0.5% to about 7% by weight of the adhesive composition prior to setting of the composition, and most desirably at about 1% to about 5% by weight of the adhesive composition prior to setting of the composition. The expansion ratio of the expandable microspheres and the loading level of the microspheres will be related to each other.

Depending on the fully expanded size of the microspheres, the amount of the expandable microspheres in the adhesive can be adjusted. Depending upon the particular expandable microspheres used in the composition, the desired amount of the microspheres in the composition may be modified. Typically, if the adhesive composition includes too high a concentration of expandable microspheres, there will be insufficient adhesion and strength upon expansion of the microspheres, and thereby weakening the structural integrity of the composite.

It has been discovered that the addition of 0.1% to about 10% of expandable microspheres by weight of the adhesive composition prior to setting allows for improved structural integrity. The dry volume of the expanded adhesive is at least 200% greater than the dry volume of the unexpanded adhesives. In preferred embodiments, it is desirable that the dry volume of the expanded adhesive is at least 400% greater than the dry volume of the unexpanded adhesives. In another embodiment, the dry volume of the expanded adhesive is at least 400% greater than the wet volume of the unexpanded adhesives. As shown in FIG. 1, a 5 milligram (0.1 gift wet bead) wet adhesive dot (FIG. 1a) on a substrate can expand to a height of about 2.2 mm (FIG. 1c). The expanded adhesive can maintain greater than 75% of its structural integrity of the bead height), even when compressed with a 2.6 psi pressure at 190° F. As shown in FIG. 1d, the compressed adhesive maintained a height of 1.8 mm even after the hot compression.

The adhesive composition optionally includes a plasticizer. Exemplary plasticizers are dibenzoates available as BENZOFLEX®, such as diethylene glycol dibenzoate, dipropylene glycol dibenzoate, and the like.

The adhesive composition may optionally include any polar solvent, particularly water, in the formulation.

The adhesive composition optionally further includes any tackifiers, humectants, crosslinkers, preservatives, e.g., antioxidant, biocide; filler, pigment, dye, stabilizer, rheology modifier, polyvinyl alcohol, and mixtures thereof. The addition of a crosslinker will further increase the structural integrity of the adhesive after the microspheres are expanded. These components can be included in an amount of from about 0.05% to about 15% by weight of the adhesive composition prior to setting of the composition. Exemplary preservatives include 1,2-benzisothiazolin-3-one, 5-chloro- 2-methyl-4-isothiazolin-3-one and 2-Methyl-4-isothiazolin-3-one. Typically, preservatives may be used in the amount of from about 0.05% to about 0.5% by weight of the adhesive composition prior to setting of the composition.

The adhesive composition may further include an accelerator. The accelerator is a multivalent cation from water-soluble salts, including commonly available aluminum nitrate ($Al(NO_3)_3$), zirconium acetate, ammonium zirconyl carbonate (available as Bacote 20 from Zirconium Chemicals). The addition of a multivalent water-soluble salt shortens the time required for radiation during the expansion of the adhesive composition.

Although the adhesive can start to coalesce at room temperature, the adhesive composition may still have high moisture content and will be substantially fluid. For adhesives with expandable microspheres, a form of energy may be introduced to the adhesive to expand the microspheres before fully drying the adhesive. Partially drying the adhesive composition (i.e., leaving a higher amount of moisture in the adhesive, such as at least 10% moisture content) allows the expandable microspheres to expand. The form of energy for expansion is typically heat from conduction, induction or radiation. For adhesives containing pre-expanded microspheres, no additional form of energy is necessary.

For both expandable and pre-expanded microsphere containing adhesives, heaters and fans may be used to drive off the excess water to aid in drying the adhesives. In a particularly desirable embodiment of manufacturing products, the adhesive composition may be applied to the surface (or surfaces) of a substrate and subjected to heat sufficient to coalesce the adhesive. At the onset of adhesive coalescence and while the adhesive is still substantially fluid-like, the adhesive may aid in holding the adhesive and microspheres in place, but will allow the microspheres the freedom to expand. In one embodiment, the heat may then be raised to a temperature sufficient to expand the microspheres. It is preferable for the heater to be set to a temperature range between the Texp and Tmax of the microspheres. Finally, the heat may be raised again to a temperature sufficient to fully drive the water off the adhesive composition. Heat may be applied by any desired method, including in an oven or through the use of heated rollers. It should be noted that the various stages (onset of setting, expansion of the microspheres, and fully drying the adhesive) may be achieved by radiation energy, either as a replacement for, or in addition to, direct heat. That is, for example, the various steps may be achieved by use of microwave or radiofrequency radiation. Besides conduction, induction heating method may be used in the process. In addition, the process may include any combination of heat application and radiation application. For example, the initial coalescence of the adhesive may be achieved through direct heat, while the expansion of the microspheres may be achieved through application of radiation energy.

Other additives may be included in the composition to increase the coalescence of the adhesive, is desired.

The inventive adhesive is particularly suitable for insulative packages that are typically directed for use at elevated and/or reduced temperatures and requires thermal insulation.

Another embodiment provides a method of preparing an article having improved structural integrity and insulative properties, including the steps of: (a) providing a first substrate having a first side and second side; (b) providing a second substrate having a first side and second side; (c) preparing an adhesive composition by combining (i) an emulsion-based polymer selected from the group consisting of vinyl acetate ethylene dispersion, polyvinyl acetate, polyvinyl acetate polyvinyl alcohol, dextrin stabilized polyvinyl acetate, polyvinyl acetate copolymers, vinyl acetate-ethylene copolymers, vinylacrylic, styrene acrylic, acrylic, styrene butyl rubber, polyurethane and mixtures thereof; (ii) a plurality of expandable microspheres, and optionally (iii) a plasticizer and (iv) water to form an adhesive; (d) applying the adhesive either (i) to a surface of the first side of the first substrate, (ii) to a surface of the second side of the second substrate or (iii) to both a surface of the first side of the first substrate and a surface of the second side of the second substrate; (e) contacting the first substrate and the second substrate together where the applied adhesive is interposed between the two substrates to form a composite structure; and (f) applying heat and/or radiation to expand the expandable microspheres to form a bond adhering the first and the second substrates together. The resultant multilayer substrate with an adhesive containing the microspheres has an improved structural integrity and thermal insulation.

The adhesives may be formed immediately prior to applying onto a substrate or pre-made in advance and stored until needed.

Another embodiment is directed to insulated packages and a method for forming insulated packages. The packages include cups, food containers, cases, cartons, bags, lids, boxes, envelopes, wraps, clamshells, and the like. It is particularly preferred that the substrates of the packages have a reduced basis weight, caliper, and fiber content as compared to traditional substrates used for the same packages.

The substrates include fibreboards, chipboards, corrugated boards, corrugated mediums, solid bleached boards (SBB), solid bleached sulphite boards (SBS), solid unbleached board (SLB), white lined chipboards (WLC), kraft papers, kraft boards, coated papers, binder boards, and oriented polypropylene films and reduced basis weight substrates.

In one embodiment, there is provided an insulating sheet including a substantially flat paper or film liner having a first side and a second side. The first side of the paper or film liner includes a plurality of expandable microspheres secured thereto in an adhesive composition, where the plurality of expandable microspheres has been expanded and the adhesive composition has been dried. Thus, the product includes a paper or film liner having an adhered, foam-like composition on the first side thereof. The expandable microspheres include those described above, and the adhesive composition includes the components described above, including the emulsion polymer, and optional polar solvent, plasticizer, humectants, preservatives, or fillers.

The adhesive composition may be applied to the first surface of the paper or film liner in any configuration desired, including in a series of dots, stripes, waves, checkerboard patterns, any general polyhedron shapes that have substantially flat bases, and combinations thereof Application of these patterns decreases the amount of adhesive in the packages. Further, the adhesive composition may be applied to the first surface in a series of cylinders. In addition, if desired, the adhesive composition may be applied to the first surface as a substantially flat sheet of adhesive covering the entire first surface (full lamination) or covering a portion of the first surface. The adhesive composition may be applied in the presence of heat if desired; however, it is important that the heat at application not be so high as to fully set the adhesive composition before expanding the expandable microspheres. A skilled artisan can determine this amount of pressure without undue experimentation. Optionally, a second paper or film liner may be applied to the top surface of the adhesive composition, forming a sandwiched configuration of: first paper or film liner—adhesive with expanded microspheres—second paper or film liner.

After the adhesive begins to coalesce, the paper or film liner is then exposed to heat and/or radiation energy sufficient to expand the plurality of microspheres. In one embodiment, the paper or film liner with wet adhesive thereon is exposed to heat at a temperature sufficient to expand at least a majority of the microspheres, in between the ranges of Texp and Tmax. In another embodiment, the paper or film liner with wet adhesive thereon is exposed to microwave or infrared energy sufficient to expand at least a majority of the expandable microspheres. The resulting product is a paper or film liner having an adhesive having expanded microspheres therein. The adhesive composition may then be exposed to heat and/or radiation energy sufficient to fully set the adhesive composition.

If desired, after application of the adhesive composition to the first side of the paper or film liner, a second paper or film liner having a first side and second side may be provided and the first side of the second paper or film liner applied to the surface of the applied adhesive composition, forming a sandwich configuration. Thereafter, expansion of the microspheres and setting of the adhesive may take place as explained above.

Multilayer substrate packages formed with the inventive adhesives containing microspheres improve the ability of the package to withstand strain under a constant stress at elevated temperatures. It is expected to those skilled in the art that the strain of the adhesive increases with the addition of microspheres at elevated temperature. The inventive adhesive is particularly suitable for consumer packages that are typically directed for use at elevated and/or reduced temperatures. The inventive adhesive provides structural support in between the paper boards of the package, and this maintains the structural integrity of the package, and thereby insulation is improved for the package.

In one embodiment, there is provided a multilayer substrate that contains two substrates and the adhesive, without any further substrates, e.g., a medium. Heretofore, it has been difficult to achieve a product that has the necessary thermal insulation and structural integrity without including a medium layer. The adhesive may be applied to completely coat the two liners or in a selected or a random pattern. The insulated article with patterned adhesive allows for gaps within the two liners.

Yet in another embodiment, the insulated article comprises a substantially flat substrate and a non-flat, rounded substrate. The adhesive is applied either to the substantially flat substrate, the non-flat substrate, or to both substrates, to form the insulated article. The adhesive may be applied to completely coat (full lamination) the surface of the substrate(s) or to selectively coat portions of the surface of the substrate(s). The pattern can be random or various ordered designs. The resulting article thus has an insulating space between the liner surfaces. The articles with patterned adhesives mimic medium structure of interposed between the two substrates. The space between the two substrates are generated and maintained by the adhesive.

Another exemplary consumer package is a corrugated box package formed with lower basis weight liner and medium. The substrates are made of paper that has a reduced basis weight when compared to traditional insulating corrugated boards.

The present invention may be better understood through analysis of the following examples, which are non-limiting and are intended only to help explain the invention.

EXAMPLES

Example 1

Formation of an Adhesive with Improved Insulating Properties

An adhesive composition was prepared having the following composition:

| Component | Component | Wt. % |
| --- | --- | --- |
| Water-soluble resin emulsion | Polyvinyl acetate stabilized with polyvinyl alcohol, with a solids content of 56% | 63 |
| Water-soluble resin emulsion | Polyvinyl acetate stabilized with dextrin, with a solids content of 63% | 30 |
| Expandable microspheres | DUALITE ® U020-125W | 3 |
| Plasticizer | Glycerine | 4 |

The above components were mixed in a vessel and then applied in between two paper substrates as thin, bead stripes of 0.1 g/ft to form a composite. The bead stripes were expanded by microwave heating. A comparative composite was made in the same manner, maintaining the same fly separation as the composite, but without any adhesive stripes as support.

Both composites were tested for their insulative properties with a thermal imaging technique (Infrared Cameras Inc.'s ICI-7320 USB camera and the accompanying IR Flash software (version 2.12.12.7). A 190° F. heat source was placed on one side of the composite and the surface temperature of the composite was monitored from the opposite side. The surface temperature of the composite and comparative composite with its corresponding time are shown in the following table.

| Time Lapsed, seconds | Comparative composite (° F.) | Composite (° F.) | Temperature difference |
| --- | --- | --- | --- |
| 0 | 77.6 | 78.1 | −0.5 |
| 1 | 77.7 | 78.2 | −0.5 |
| 2 | 78.4 | 78.4 | 0.0 |
| 3 | 79.3 | 79.1 | 0.1 |
| 4 | 81.0 | 79.7 | 1.3 |
| 5 | 90.9 | 82.0 | 8.9 |
| 6 | 100.4 | 88.8 | 11.6 |
| 7 | 109.0 | 97.1 | 11.9 |
| 8 | 116.7 | 104.9 | 11.8 |
| 9 | 122.9 | 111.5 | 11.4 |
| 10 | 128.0 | 117.3 | 10.7 |

As shown above, the composite with the inventive adhesive retained heat better than the comparative composite.

Example 2

Structural Integrity

The expanded adhesive can maintain its structural integrity even during hot compression. As shown in FIG. 1, a compression of 2.6 psi at 190° F. is applied to a bead height of 2.4 mm for 60 seconds by Texture Analyzer (FIG. 1c).

The bead maintained greater than 75% of bead height, and the final height after the compression was 1.8 mm (see FIG. 1d).

The invention claimed is:

1. An article comprising a first substrate, a second substrate, and an adhesive composition interposed between the two substrates comprising:
    (a) about 50 to about 99.9 weight percent, on a dry weight basis, of an emulsion-based polymer selected from the group consisting of vinyl acetate ethylene dispersion, polyvinyl acetate, polyvinyl acetate polyvinyl alcohol, dextrin stabilized polyvinyl acetate, polyvinyl acetate copolymers, vinyl acetate-ethylene copolymers, vinylacrylic, styrene acrylic, acrylic, styrene butyl rubber, polyurethane and mixtures thereof;
    (b) about 0.1 to about 10 weight percent, on a dry weight basis, of a plurality of expandable microspheres;
    (c) water; and
    (d) optionally, plasticizer and/or preservative;
wherein the volume of the microspheres is greater than 200% in the dry adhesive upon expanding the microsphere.

2. The article of claim 1 wherein the first and the second substrate are selected from the group consisting of fiberboard, corrugated board, solid bleached boards, kraft paper, coated paper or oriented polypropylene film.

3. The article of claim 2 wherein the first and the second substrate are haft paper or coated paper.

4. The article of claim 2 wherein the boards and papers comprise a portion of recycled fiber.

5. The article of claim 1, wherein the emulsion-based polymer is selected from the group consisting of vinyl acetate ethylene dispersion, polyvinyl acetate.

6. The article of claim 1, wherein the plurality of microspheres are present in an amount of from about 0.5 wt % to about 5 wt %, based on the total (wet) weight of the adhesive.

7. The article of claim 6, wherein the microspheres are expandable polymeric microspheres.

8. The article of claim 1, wherein the adhesive further comprises a crosslinker, filler, pigment, dye, stabilizer, rheology modifier, polyvinyl alcohol, humectant and the mixtures thereof.

9. The article of claim 1, wherein the adhesive further comprises an accelerator that is a multivalent water-soluble salt.

10. The article of claim 9, wherein the accelerator is selected from the group consisting of aluminum nitrate, zirconium acetate, ammonium zirconyl carbonate and mixtures thereof.

11. The article of claim 1, which is selected from the group consisting of a cup, food container, case, carton, bag, box, lid, envelope, wrap or clamshell.

* * * * *